March 30, 1948. R. A. HARTMAN 2,438,499
FASTENING DEVICE
Filed July 13, 1944

INVENTOR.
RICHARD A. HARTMAN
BY
Bates, Teare, & M'Bean
ATTORNEYS

Patented Mar. 30, 1948

2,438,499

UNITED STATES PATENT OFFICE 2,438,499

FASTENING DEVICE

Richard A. Hartman, Cleveland, Ohio, assignor to Tinnerman Products, Inc., Cleveland, Ohio, a corporation of Ohio Application July 13, 1944, Serial No. 544,674

7 Claims. (Cl. 85—40)

This invention relates to fastening devices, particularly to those which are made of sheet metal and that are adapted for holding a plurality of panel-like members together.

Heretofore the practice of holding relatively thin panel members together has embodied the use of bolts and nuts, but such arrangement has been objectionable not only in regard to the time required to make the assembly, but also in that access to the nuts is frequently difficult of attainment.

An object of the present invention is to make a sheet metal fastener which is well adapted to be readily inserted through registering openings in two members that are to be connected together, and that is adapted for snap fastening engagement with said members so as to hold the members together solely by the inherent resiliency of the fastening device. The invention additionally contemplates a construction by means of which the fastener will function automatically to hold the parts together, notwithstanding any vibration to which they may be subjected during use.

A further object of the invention is to make a sheet metal fastener which although operating it at all times to maintain the parts in assembled relationship, may nevertheless be removed therefrom and thereafter re-used in an expeditious manner.

Figure 1:
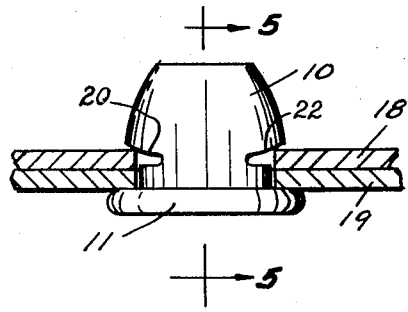
Figure 2:
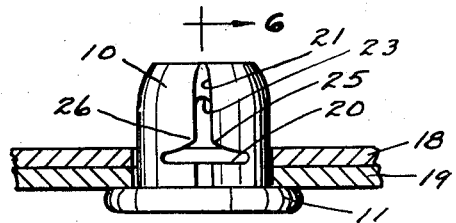
Figures 3, 4:
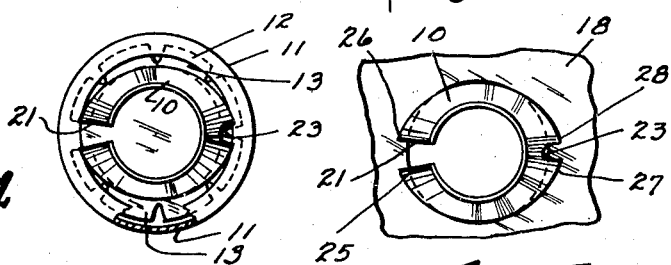
Figure 5:
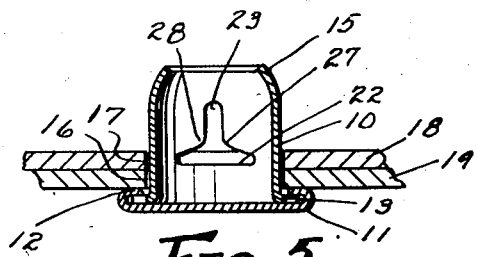
Figure 6:
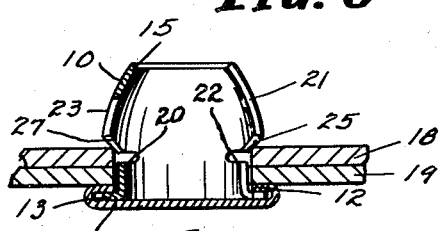
Figure 7:
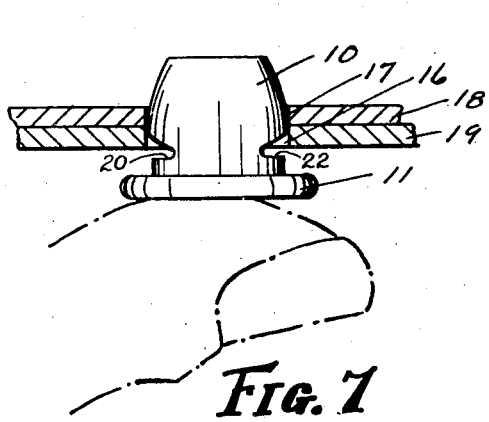
Figure 8:
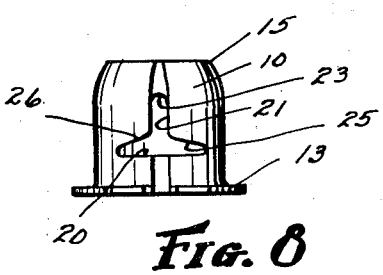

Referring now to the drawings, Fig. 1 is a section taken through two sheet metal members that are fastened together by means of a device embodying the present invention; Fig. 2 is a view similar to Fig. 1, taken from a position at right angles to that of Fig. 1; Fig. 3 is a top plan view of the assembled structure; Fig. 4 is a bottom view of the assembled structure; Figs. 5 and 6 are sections taken on planes indicated by the correspondingly numbered lines in Figs. 1 and 2, respectively; Fig. 7 is a view illustrating the fastening device in the process of being applied to the sheet members; and Fig. 8 is a side view of the body portion of the fastener with the closure removed therefrom.

In the drawings, the fastener comprises a two-piece construction in the form of a tubular body structure 10 and a closure 11 for one end thereof. The closure may be attached to the body by a peripheral flange 12 that is gripped around a flange 13 on the body. The end of the body opposite the flange is tapered inwardly, as at 15, to facilitate entrance thereof into registering openings 16 and 17 in the plates 18 and 19, respectively.

The body of the fastener is shown as comprising substantially a split cylinder which may be suitably heat treated to impart resilient characteristics thereto. A portion of the cylinder is made larger in diameter than the diameter of the openings in the plates 18 and 19, so that the fastener must be compressed slightly to make it enter the openings, but will expand to effect a locking engagement against the outside faces of the parts 18 and 19 so as automatically to hold them together merely upon insertion of the fastener through the openings from one side of one of the panels.

To assure an automatic snap fastening action between the fastener and the panels, I utilize the flange adjacent one end of the body for a shoulder to engage the outside face of one panel, and I utilize cam surfaces on the body for engaging the other panel adjacent the exterior surface thereof. The inherent resiliency of the tubular portion tends to urge the cam surfaces against the associated panel and thereby operates to maintain the parts in the desired assembled relationship without the need for any extraneous holding members.

A preferred means for accomplishing the automatic retention of the fastener in assembled relationship embodies transverse slots, one of which, designated 20, extends transversely of the slot 21, which in turn comprises the gap formed by the split ring construction of the body, and the other of which is designated at 22, extends transversely of a slot 23. The latter extends axially of the body and preferably in diametrical opposition to the slot 21. The intersecting slots 20 and 21 form tongues 25 and 26, while the intersecting slots 22 and 23 form tongues 27 and 28, as shown particularly in Figs. 2 and 5. The walls of the slots 20 and 22 nearest to the end 15 of the body are tapered toward the end so as to provide cam surfaces which coact with the flange to clamp the panels together. For such purpose, therefore, one end of each cam surface is arranged to be disposed inside the confines of the panel to which the fastener is to be applied, and the other end of each slot is arranged to be disposed outside the confines of the panel so that the panel will preferably engage the cam surfaces at a point intermediately the ends thereof.

To effect an interlocking engagement between the fastener and the panel, I have shown the body as having the tongue portions 25, 26, 27, and 28, flared outwardly, as shown in Fig. 3, whereby the distance diametrically across opposing tongues is greater than the diameter of the aperture in the panels through which the fastener extends. It is to be understood that the gap which forms the slot 21 is sufficiently large to permit the body to be compressed enough to admit it into the panel opening merely by pressure exerted by the thumb of a user against the closed end thereof, as is illustrated in Fig. 7, and it is to be understood that the inherent resiliency in the material of which the body is made operates to effect a snap-fastening engagement between the fastener and the body as soon as the ends of the tongues clear the outside face of the panel 18. By effecting an engagement on the cam surfaces intermediate the end portions thereof, the fastener resists the tendency to loosen as a result of vibration and operates automatically to maintain a satisfactory locking connection at all times.

An advantage of my invention is the fact that apart from the ease of insertion and of automatic locking by virtue solely of the insertion, the fasteners may be readily removed merely by contracting the tubular body portion until the tongues clear the wall of the opening in the panel, and driving the fastener outwardly in a direction opposite to that employed for making the assembly. Such removal in no way alters the shape of the fastener, whereby it may readily be reused as often as desired. The ease with which the fastener may be employed and the resistance which it offers against removal makes it especially suitable for fastening together various parts of sheet metal structures or for holding metal trim in assembled position.

I claim:

1. A fastening device comprising a hollow body of sheet material having a slot extending generally longitudinally thereof for permitting contractability during the insertion thereof through an opening in a support, said body having tongues disposed adjacent said slot and having other outwardly acting tongues spaced peripherally therefrom and cooperating therewith to engage one side of said support, said body having means thereon spaced from the tongues and extending outwardly therefrom for cooperating with the tongues to hold an article on said support.

2. A fastening device comprising a hollow body of sheet material adapted to be passed through an opening in a support, said body having intersecting slots therein and having portions adjacent the slots flared outwardly therefrom and adapted to provide shoulders for engaging the walls of said openings, said body having a flange adjacent one end thereof for bearing against a part adapted to be secured to said support, whereby said article and support are automatically fastened together solely by the inherent expansible characteristic of the body resulting from inserting it axially through said article and support.

3. A fastening device comprising a hollow body of sheet material adapted to be passed through an opening in a support, said body comprising substantially a split cylinder construction, a closure for one end of the body, the body having intersecting slots forming tongues, the tongues being extended beyond the normal outer surface of the body and having cam surfaces on the edges thereof nearest the closure, said cam surfaces and closure portion cooperating to retain the device in assembled position upon a support.

4. A fastening device comprising a hollow body of sheet material having one end thereof tapered inwardly to facilitate entrance thereof through an opening in a support and having a flange on the opposite end thereof, a closure for one end of the body, the closure having a portion thereof gripping said flange to retain it on the body, said body being slitted axially to permit flexibility and expansibility thereof and having a slot extending transversely of said slit, and forming tongues, said tongues being flared outwardly from the surface of the body and having cam surfaces on the edges nearest to the flange, said tongues cooperating with the flange to retain the device in assembled position on the support.

5. A fastening device comprising a hollow body of sheet material adapted to be passed through an opening in a support, said body having a shoulder adjacent one end thereof and having pairs of intersecting slots therein one slot of each pair being substantially parallel to the shoulder providing corners embodying cam surfaces which cooperate with the shoulder to hold an article in assembled relation on said support.

6. A fastening device comprising a hollow body of resilient sheet material having a slot extending generally longitudinally thereof for permitting contractability during the insertion thereof through an opening in a support, said body having a lateral slot intersecting the longitudinal slot to provide spaced tongues disposed adjacent said slot and having another tongue projecting from a relatively distant position around the perimeter of the body, all of said tongues being adapted to engage one side of said support, said body having means thereon spaced from the tongues and extending outwardly therefrom for cooperating with the tongues to hold an article on said support.

7. A fastening device comprising a hollow body of sheet material adapted to be passed through an opening, said body having an outward shoulder adjacent one end thereof and having a plurality of T-shaped openings in its wall, the stem of each T extending longitudinally of the body to permit contraction thereof during insertion through an opening in a support, and the head of each T extending substantially parallel to said outward shoulder and with the stem providing corners to engage the inner surface of a support when the said shoulder coacts with the outer surface.

RICHARD A. HARTMAN.

REFERENCES CITED

The following references are of record in the file of this patent:

UNITED STATES PATENTS

| Number | Name | Date |
|---|---|---|
| 1,813,892 | Jones | July 7, 1931 |
| 1,963,814 | Walters | June 19, 1934 |
| 2,255,650 | Burke | Sept. 9, 1941 |
| 2,391,298 | Davis | Dec. 18, 1945 |